United States Patent

Gisby et al.

[11] Patent Number: 6,044,146
[45] Date of Patent: Mar. 28, 2000

[54] METHOD AND APPARATUS FOR CALL DISTRIBUTION AND OVERRIDE WITH PRIORITY

[75] Inventors: Douglas Gisby, Foster City; Paul Cronin, Saratoga, both of Calif.

[73] Assignee: Genesys Telecommunications Laboratories, Inc., San Francisco, Calif.

[21] Appl. No.: 09/024,825

[22] Filed: Feb. 17, 1998

[51] Int. Cl.⁷ ......................................... H04M 3/00
[52] U.S. Cl. .............................................. 379/265
[58] Field of Search .................. 379/265, 266, 379/309, 38; 370/412, 444, 352

[56] References Cited

U.S. PATENT DOCUMENTS

| | | | |
|---|---|---|---|
| 5,621,790 | 4/1997 | Grossman et al. | 379/266 |
| 5,689,229 | 11/1997 | Chaco et al. | 379/38 |
| 5,721,770 | 2/1998 | Kohler | 379/266 |
| 5,905,793 | 5/1999 | Flockhart et al. | 379/266 |

*Primary Examiner*—Chi H. Pham
*Assistant Examiner*—Maikhanh Tran
*Attorney, Agent, or Firm*—Donald R. Boys; Central Coast Patent Agency

[57] ABSTRACT

A communication router receives incoming communications and assigns a priority to each, which are then placed in a routing queue in descending order of priority from the head of the queue, to be routed from the head of the queue to selected destinations. The invention is particularly applicable to routing telephone calls in a call center. Destinations, in the call center agent stations are selected on a basis of agent availability, and an agent status may be available if the agent is involved in a call of lower priority than a call to be routed. In some embodiments displaced calls may be placed back in the routing queue in order of priority. The invention is applicable to routing a wide variety of communications, such a telephone calls, e-mails, video calls, and Internet Protocol calls.

9 Claims, 4 Drawing Sheets

Agent Status (Real-Time Request and Priority Assignment)

Agent Status (Real-Time Request and Priority Assignment)

METHOD AND APPARATUS FOR CALL DISTRIBUTION AND OVERRIDE WITH PRIORITY

FIELD OF THE INVENTION

The present invention is in the field of telephony including multimedia communications and has particular application to methods for call priority assignment, distribution, and override for call distributing and routing functions.

BACKGROUND OF THE INVENTION

The present invention relates in preferred embodiments to callcenters in the art of telephony systems. Call centers are typically hosted by a company or organization for purposes of providing a service to clients, such as technical assistance or catalogue sales and the like. In a typical call center agents are employed at agent stations having at least one telephone, and in many cases other equipment, such as a personal computer with a video display unit (PC/VDU).

Modern call centers typically have call-switching equipment for directing incoming calls to telephones at agent stations, and computer integration with the switching equipment is now common. This technique is known in the art as computer telephony integration (CTI). In a CTI system a processor is connected to the switching equipment by a CTI link, and the processor runs CTI applications controlling the switch. PC/VDUs at agent stations may be interconnected on a local area network (LAN) also connected to the CTI processor.

Development of CTI call centers has made it possible for agents to interact with callers (clients) in more ways than just by telephone. In a suitably equipped call center, agents can operate with E-mail, Video mail, Video calls, and Internet Protocol Network Telephony (IPNT) calls as well as plain old telephony service (POTS) calls. Further to the above, such a modern call center may also be linked to other call centers, data bases, and the like in a variety of ways, such as by local area networks (LAN), wide area networks (WAN), including the World Wide Web (WWW), and various other types of linked-computer networks, such as wireless, satellite based, etc.

Call centers are organized to receive and distribute incoming calls to a plurality of agents at the call center. There may be a large volume of incoming calls and a large number of agents. As described above, calls are not limited to POTS calls, but may include communications of many other sorts. Call routing to and within call centers involves processors and software dedicated to directing calls to appropriate agents for processing and response.

Routing of calls, then, may be on several levels. Pre-routing may be done at Service Control Points (SCPs) or other network access points at the network level and further routing may be, and generally is, accomplished at individual call centers.

To distribute incoming calls to agents in a call center, the distribution system has to have some criteria for distribution. Most commonly there is capability for the distribution system to track which phones are on hook or off hook, so the system may monitor which agents are busy on calls or not busy. In the simplest system, then, calls are distributed on a first-in-first-out basis to available agents.

It has occurred to the inventors that a desirable goal relating to call center communication is to have agents busy on high priority calls rather than spending a lot of time covering calls of a lesser importance. For example, a high priority call may be a sales order call wherein the caller is purchasing a product or service over the telephone. A lesser priority call may be a caller who is just curious about the product or service and has a few questions to ask the agent. It would be desirable as well to be able to transfer a higher priority call to be taken by an agent who is currently engaged with a lower priority call, without having to lose the original call.

In a typical first in first out (FIFO) queue situation, the fist call in is the first call out regardless of importance of the call, and there is typically no facility for prioritizing calls. What is clearly needed is a priority determination method and control routines that will enable determination and assignment of priority to a call, and based on call priority, agent availability and skill-set, route that call to the best-matched next available agent. Availability in such a system could be adjusted according to priority of any call which an agent may be processing. Additionally, calls bumped could be requeued.

SUMMARY OF THE INVENTION

In a preferred embodiment of the present invention a communication router is provided, comprising a priority module adapted to determine and assign a routing priority to arriving communications to be routed, and a routing queue. Communications are routed in order from the head of the queue, and prioritized communications are placed in the routing queue in descending order of priority from the head of the queue. The communications may be plain old telephone service (POTS) calls, and the router may execute on a processor coupled to a telephony switch in a telephony call center.

The communication router may further comprise a selection module for selecting a routing destination for a prioritized communication, and, in this embodiment destinations for routing may be telephones at agent stations in a call center, and selection is made partly on the basis of agent availability.

In a unique aspect of the invention an agent may be considered available if the agent is engaged in a previously routed call of lower priority than a new call to be routed, and the call the agent is engaged in may be bumped. Bumped calls in some embodiments may be placed back in the routing queue in order of priority.

The router of the invention is applicable to many types of communications other than telephone calls, such a Internet Protocol calls, e-mails, video calls, and the like. Further, routing may be to machine processing units rather than to human agents.

In an aspect of the invention a telephony call center is provided comprising a call switching apparatus having at least one incoming trunk and two or more telephony channels to telephones at agent stations; a Computer Telephony Integration (CTI) processor connected to the call switching apparatus and running a CTI application; and a routing system. The routing system is adapted to assign priority to incoming calls, and to cause calls to be placed in a queue of calls to be routed according to order of priority. In this aspect, in some embodiments the routing system has access to a database containing information about callers, and priority is determined in part by accessing caller information in the database. Also, there may be information about a call or the caller forwarded with a call, and this information may be used in determining and assigning priority. In some embodiments, agent status is determined partly by priority of any active call the agent may be handling, and an agent may be classified as available for receiving a call if the call to be routed is of higher priority than the call in which an agent is engaged. In this situation calls may be bumped, and a call bumped at an agent station by a higher priority call may be placed back in the routing queue in order of priority.

In another aspect a method is provided for practicing the invention, comprising steps of (a) assigning priority to incoming communications, creating thereby prioritized communications; (b) placing the prioritized communications in a routing queue wherein calls are routed sequentially from the head of the queue in order of priority; (c) selecting a destination for each call reaching the head of the queue; and (d) routing the prioritized communications to selected destinations in order of priority. The calls may be Plain Old Telephony Service (POTS) calls, electronic mails, or other sorts of communications. Again, the selected destinations may agent stations adapted for agents to receive and to interact with the routed, prioritized calls. Further in the methods taught, in the selection step an agent may be selected for receiving a routed call even though the agent is already engaged in a call, if the call to be routed is assigned a higher priority than a call in which the agent is engaged. Bumped calls may be re-routed.

In embodiments of the present invention a facility is provided that maximizes efficiency of call centers and other message and communication routing, wherein priority communications may enjoy priority service, and a hosts objectives may be better met.

BRIEF DESCRIPTION OF THE DRAWING FIGURES

DESCRIPTION OF THE PREFERRED EMBODIMENTS

Figure 1:
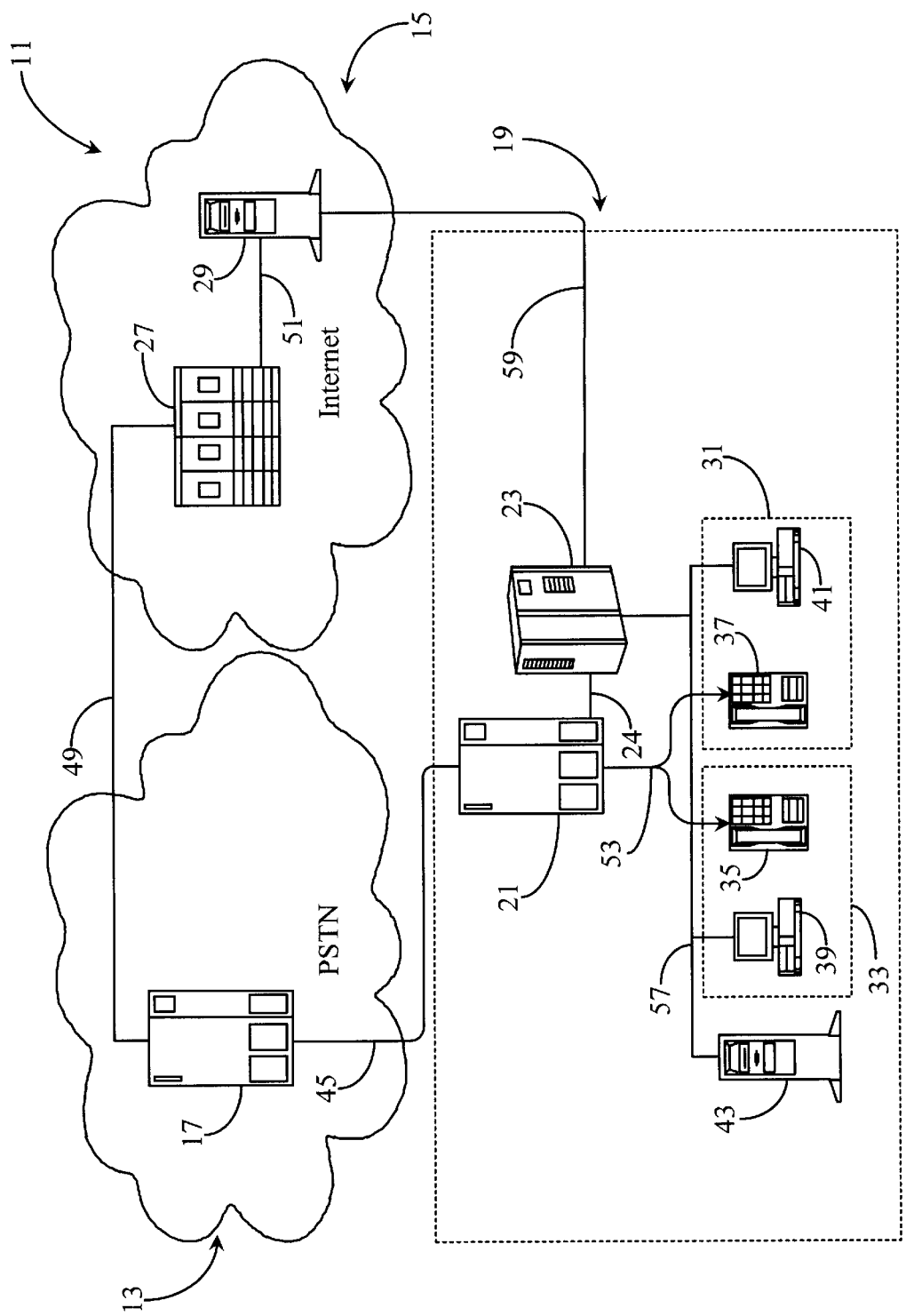
FIG. 1 is an overview of a call center environment wherein call distribution is based on call priority level according to an embodiment of the present invention.

FIG. 1 is an overview of a call center environment wherein call distribution is based on call priority levels according to an embodiment of the present invention. A telephony communications network 11 comprises a call center 19 connected to a publicly-switched telephony network (PSTN) 13 and connected also to the Internet 15. Telephony communication systems with Internet connectivity such as telephony communication system 11 are known to the inventors, and are capable of multi-media and Internet-Protocol communication.

A telephony switch 17 in the PSTN is illustrated to represent any call handling equipment in the network, which may be extensive including computer integration. POTS calls from the network are delivered over at least one broad-band telephony trunk 45 or an equivalent of one or more regular trunks to a telephony switch 21 within call center 19. It will be apparent to the skilled artisan that the PSTN may also be a private network rather than a public network and Internet 15 may be of the form of another wide area network (WAN) such as are known in the art. The embodiment illustrated herein represents just one example of a telephony communications environment that can utilize the method and apparatus of the present invention. Further, the method and apparatus of the present invention can be implemented in a telephony communications system that is not linked to a WAN, or, in a WAN communications system that is not liked to a telephony network. However, in a preferred embodiment, the present invention is utilized with voice calls arriving at a call center such as call center 19 within the scope of a CTI telephony architecture.

Referring again to FIG. 1, POTS calls from PSTN 13 are, in this embodiment, routed to telephony switch 21. A CTI processor 23 is linked to switch 21 via a CTI link 24. CTI processor 23 provides computer enhancement to call center 19. Routing protocol and similar control routines such as statistical and skill based routines may be stored and executed via processor 23. Processor 23 is, in this embodiment, connected to a LAN 57. LAN 57 also interconnects PC/NVDUs at individual agent stations within call center 19 such as an agent station 31 and an agent station 33. Agent station 31 comprises an agent's telephone 37 and an agent's PC 41. Agent station 33 comprises an agent's phone 35 and an agent's PC 39. A client information system (CIS) data server 43 is also connected to LAN 57. CIS data server 43 is used to store information regarding clients, such as transaction history, preferences, order information, and the like.

It will be apparent to those with skill in the art that there may be other servers connected to LAN 57 for various purposes, such as routing and the like.

Processor 23 is linked to an Internet File-Server 29 via a digital connection 59. Switch 17 in PSTN 13 is shown connected to connected to Internet Service Provider (ISP) 27 via connection 49. The Internet connectivity is meant to show only that client's with access to PSTN 13 may have multiple ways to communicate with agents at call center 19, such as Internet-based multimedia communication as well as POTS telephony communication. WAN access such as access to Internet 15 may be of the form of a dial-up connection or a connection that remains open so that agent's PC's are continually connected to Internet 15 while an agent at the agent station is logged in.

It is an object of the present invention to assign priority to incoming calls and to route calls to agents at the call center based on the assigned priority, together with information about agent skill and status. The invention may be practiced, as will be seen, relative to POTS calls, video calls, e-mail, and to any other type of communication directed to a plurality of persons such as agents at a call center. The features of the invention will be made clear by considering an embodiment directed to routing POTS calls to agents at stations in a call center.

Figure 2:
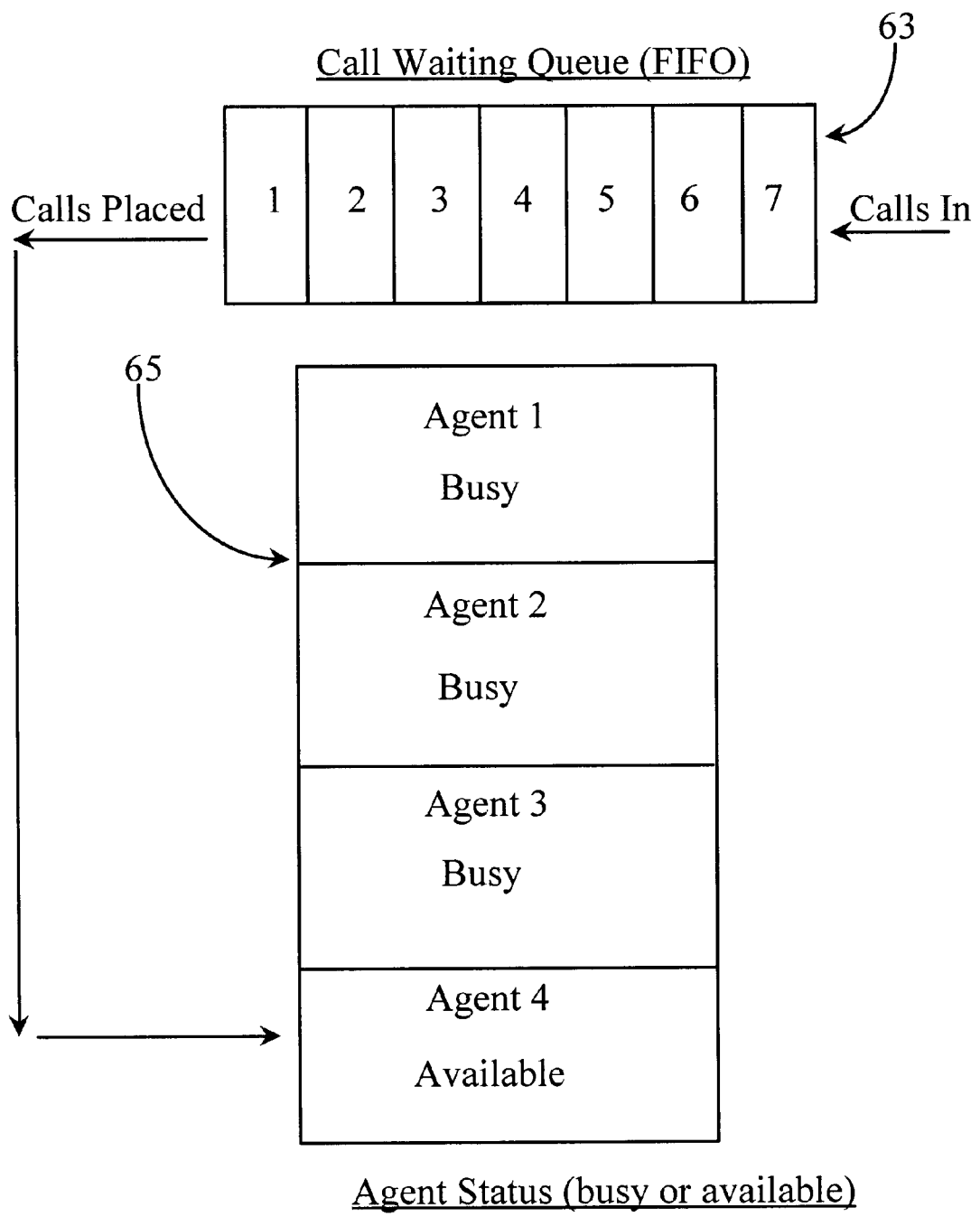
FIG. 2 is a block diagram illustrating a typical call-waiting queue and system according to prior art.

FIG. 2 is a block diagram illustrating a typical call-waiting queue according to prior art wherein there is no priority assigned or multi-state reporting status concerning agent availability. Arriving calls are handled in a first-in-first-out (FIFO) queue 63 and are distributed to an agent group 65. In this prior art illustration queue 63 has 7 calls waiting, numbered 1–7, in the order that they were received. Agent group 65 comprises 4 agents 1–4 and agents 1–3 are busy with prior distributed calls. Agent 4 is determined to be available (not currently engaged in a phone conversation). In this simple prior art situation, call number 1 is distributed to agent number 4 without regards to priority. Calls 2–7 will be placed in order one at a time to next available agents without respect to priority.

Referring now to FIG. 1 a call distribution scheme as illustrated with reference to FIG. 2 may be accomplished by a CTI application executed on processor 23 relative to arriving calls at switch 21. The CTI application monitors switch 21 for incoming calls to a routing or call-distribution point. The status of telephones at agent stations is also monitored, so the application has access to real-time information as to which logged-in agents are busy on a call and which are not. The application operates to command switch 21 to distribute calls on a FIFO basis to logged-in available agents.

In this prior art example, there is no method for determining agent availability with regard to multiple agent states or skill-set. It can also be seen that there is no method for assigning call priority levels to calls 1–7 or using such priority in call routing. It will be apparent to those with skill in the art that the software to accomplish call distribution may be executed on processor 23, or on any other processor connected to LAN 57 with appropriate communication with the CTI application that senses activity of the call center and commands switch 21 or with the switch 21 directly.

Figure 3:
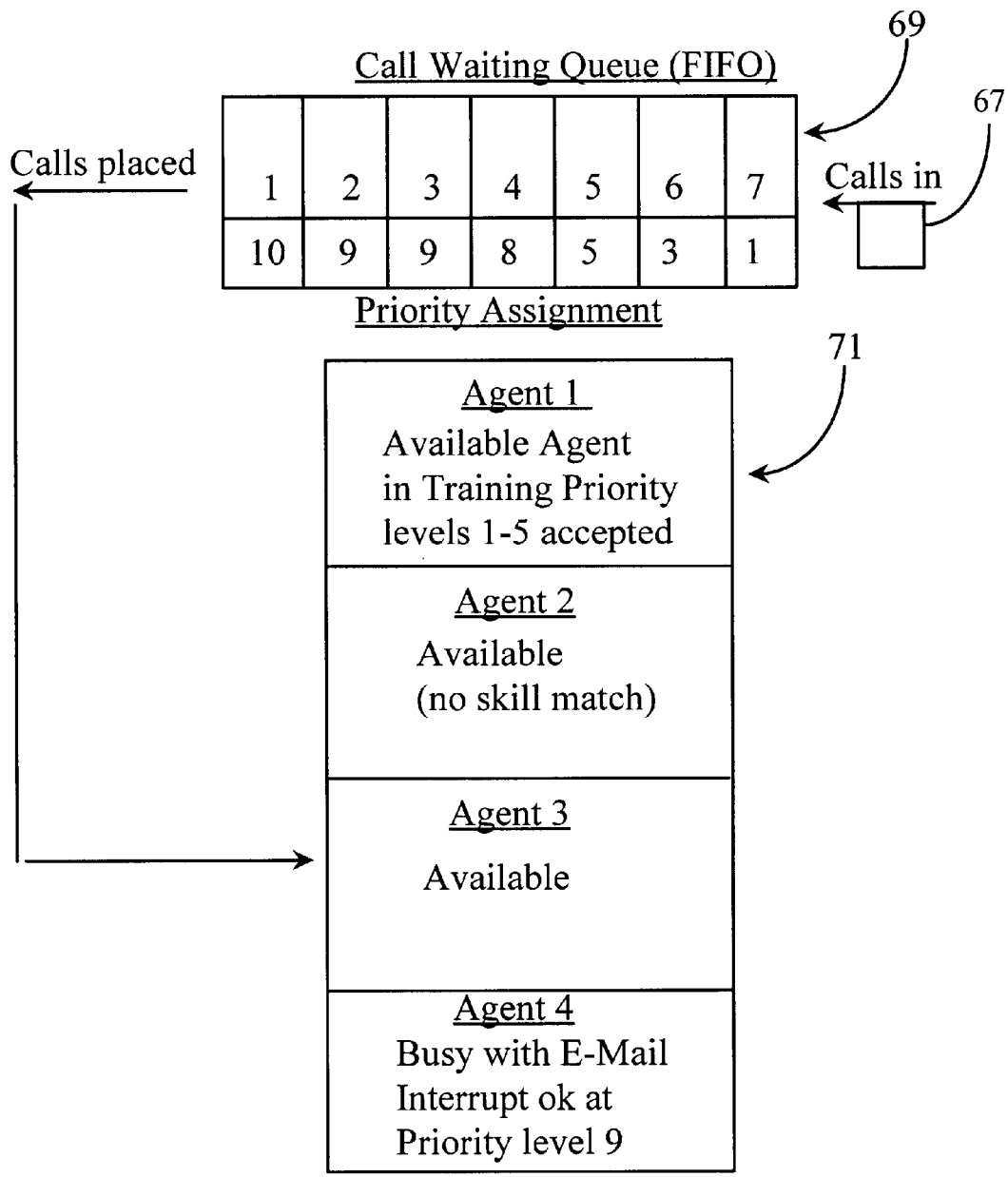
FIG. 3 is a block diagram illustrating a call-waiting queue and system enhanced with call priority assignment and distribution capabilities according to an embodiment of the present invention.

FIG. 3 is a block diagram illustrating a call-waiting queue and distribution scheme enhanced with call priority assignment and distribution capabilities according to an embodiment of the present invention. In the embodiment of FIG. 3 the call distribution scheme comprises a queue 69 and an agent group 71. Queue 69 shows waiting calls 1–7 that have been placed in queue 69 based on a priority determination with an assigned priority level from 1–10 assigned to each call. For example, call 1 has been assigned a highest priority level 10 while calls 2 and 3 have been assigned a priority level 9 and so on. Call 1 is at the head of the queue for distribution not because it was the first to arrive at the routing point in the switch, but because it was found to have the highest priority. The position of all waiting calls in the queue depends on priority assignment. A new call arriving and assigned a higher priority than a call already in the queue, will be placed in the queue ahead of the lower priority call, reorganizing the order of the queue.

Software to accomplish the novel priority-based distribution of calls as described relative to FIG. 3 may be executed on any processor accessible to and compatible with a CTI application operating in conjunction with switch 21 in the call center, just as was described for the scheme of the prior art.

To assign priority to incoming calls, and to associate the assigned priority with the call as a sub-state or attribute of the call for management purposes requires a mechanism for according and assigning the priority. This sub-system is represented as process 67 in FIG. 3. It will be apparent to those with skill in the art that there are many sources of information which may be tapped for this determination. For example, in many call centers, client information may be stored in a database accessible to the priority process (server 43, FIG. 1). Arriving calls have at least a caller-ID, from which may be used as a key to the database. Priority rules may then be established that calls from certain clients are always to be given high priority, or specific priority.

Further to client database, in many enhanced call centers known to the inventors, information may be elicited from callers (clients) at processing points in the network, and the information transferred to the call center with or ahead of the call. This information may be sorted and used according to preprogrammed rules to assign priority. Still further, equipment at the call center may be assigned to interface with callers and to elicit information. That is, an incoming call may be first connected to an IVR for the purpose of determining a client's intent, and then the system may assign priority and place the call in the queue according to the elicited information, or in conjunction with other information. Many such possibilities are extant for priority determination and assignment.

There are combinations of apparatus and rules that may be arranged for priority assignment, as described above. For further example, a call priority system may be as simple as assigning calls a priority level of 1–10. Sales agents may handle calls with priority levels 7–10 while service agents handle calls with priority levels 4–6 leaving calls with priority levels 1–3 for IVR's, automated fax responses, or perhaps, live information agents. Information gathered about the caller at the network level via methods known in the art along with any information already known about the caller is used to categorize the call and assign a priority. The call will be routed based upon that priority assignment. It will be apparent to one with skill in the art that priority level rules may vary widely depending upon the type of business. For example, a sales organization would use different criteria than a service organization. Call priority designations may be based on virtually any type of information known about or elicited from a call and caller. For the purpose of clarity in description, a 1–10 priority assignment is used in examples herein.

The software of the present invention, in one preferred embodiment, as also described above, may be executed in processor 23 or another processor linked to LAN 57 and also linked to telephony switch 21. In some embodiments, however, priority assignment and distribution may be performed either partly or entirely at the network level with software according to the present invention residing in a telephony switch-connected processor within a network such as PSTN network 13.

After placement in the queue for distribution, according to an assigned priority, calls are routed to a next available agent according to further programmed rules. In a preferred embodiment agents at a call center are also assigned sub-states. Some agents, for example, may be agents-in-training, and restricted to rules handling only low-priority calls. Other agents may be reserved for only the highest priority calls, for example.

According to a preferred embodiment, calls in progress with an agent can also be bumped with reference to priority level. In this embodiment, for instance, if an agent at agent station 31 is busy on a priority 6 call, and a priority 10 call comes to the head of the queue, then the priority 10 call would be routed to the agent, and the call in progress would be bumped.

In one embodiment suitable notification is made to the agent regarding the priority status of the next call so that the agent may dispose of the level 6 call in order to handle the more important call. Notification to the agent may be made via PC screen pop-up, audible alert, or any other method known in the art.

In some embodiments the level 6 call may be placed back in queue retaining it's priority status with regards to priority stacking within the queue. In other embodiments the displaced call may be transferred directly to another agent (if available), an interactive voice response (IVR) unit, etc. In an embodiment of the invention a lower priority call can be overridden by a higher priority call without losing the original call. Of course, in some embodiments a displaced call could just be terminated. Ideally this would not be the case.

It will be apparent to the skilled artisan that there may be a broad variety of rules and conditions with regards to agents such as incorporating various sub-states such as E-mail duties, setting interrupt rules for particular agents, and so on. For example, an agent residing at agent station 33 may be reported busy because he is answering E-mails and cannot be interrupted by a telephone call unless it is of priority 7 or above. In this case, if there are no other agents available to take the priority 7 call, it will be routed to the agent at agent station 33. He will accept the call and suspend his E-mail duty until he has disposed of the call, and so on.

The method and apparatus of the present invention allows for each agent's time to be best utilized according to skill-set and availability states. The software of the present invention can be integrated with any routing logic used at the call center such as skill-based routing and so on. It will be apparent to one with skill in the art that the method of the present invention may also be used with Internet-based communication and other forms of multi-media communication without departing from the spirit and scope of the present invention. For example, pre-routed E-mails could be assigned priority levels similar to those used with voice calls so that the higher priority E-mails are received and answered before lesser priority E-mails and so on.

In alternative embodiments of the present invention, priority determination and routing rules may be flexible, with reference to other criteria such as time-of-day and relative loading. Such criteria may be set to change automatically and/or to be responsive to administrative input.

As further examples of the flexibility of the systems of the invention, attention is again directed to FIG. 3. Agent group 71 comprises agents 1–4. Agent 1 is an agent in training and can only accept calls having a priority of 5 or less. The rules example illustrated with respect to the active state of agent 1 is indicative of a wide variety of limitations or conditions that can be programmed into the system via a system administrator, or configured by agent supervisor(s). When agent 1 logged-on to the system, his status was made available to reporting software via a database so that no calls above level 5 would be routed to that agent. The active states of agents 1–4 of agent group 71 are shown as reported to routing applications during the instance of placement of call 1. It will be apparent to one with skill in the art that availability status of agents such as agents 1–4 will change in real time as calls are placed. Agent 2 is available, but does not have a particular skill match required by call 1 such as being able to speak Spanish, etc. Agent 4 is reported busy answering E-mails and cannot be interrupted unless a call has a priority level of 9 or above. Agent 4 could receive call 1 except for a fact that agent 3 is determined available and is, in fact, the next available agent for call 1. Therefore call 1 is routed to agent 3.

Assume call 2 requires a Spanish-speaking agent and is now being placed and that agent 3 is now reported busy with call 1 (last placed call) with the status of agents 1, 2, and 4 being unchanged. In this instance, call 2 (now call 1) would be routed to agent 4. The rules example illustrated with respect to agent 4 is indicative of status reporting capability with regards to multiple sub-states with voice calls being a main state of agent availability (known to the inventor).

All calls in queue 69 are routed according to priority and according to agent availability with regards to multiple active states of agents. It will be apparent to one with skill in the art that there may be any number other than 7 calls in queue 69 as well as any number other than 4 agents in agent group 71 without departing from the spirit and scope of the present invention. The inventor chooses to show this simple embodiment and deems it sufficient for the purpose of adequately illustrating the present invention.

It will further be apparent to one with skill in the art that the method and apparatus of the present invention may be applied to a call center that is not routing calls according to agent skill-set or agent availability based on a main state and sub states of agent activity. For example, higher priority calls may be routed to a next available agent assigned to that priority level or levels. The routing logic relating to skill-sets and agent availability based on multiple agent states are methods known to the inventor and covered in previous patent applications filed by the inventor. These routing methods are used here only to show the integration possibilities between the software of the present invention and other routing applications.

Figure 4:
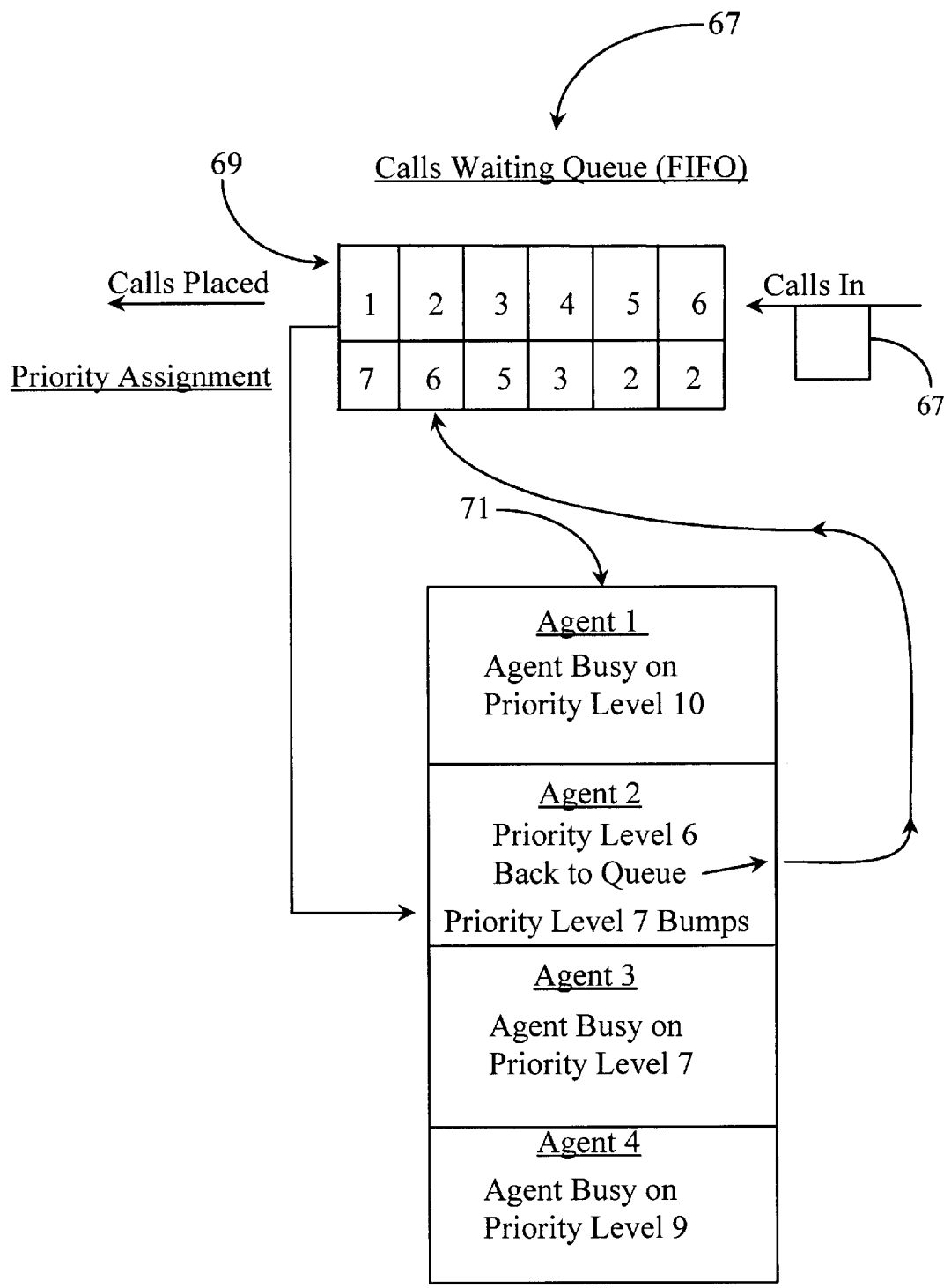
FIG. 4 is a block diagram illustrating the call-waiting queue and system of FIG. 3 showing call priority bumping according to an embodiment of the present invention.

FIG. 4 is a block diagram illustrating the call-waiting queue of FIG. 3 showing call priority bumping according to an embodiment of the present invention, wherein a call of higher priority may be accepted without losing the original call that was bumped. In FIG. 4 all agents are busy and a priority 7 call is to be routed. Calls in the queue are shown from the head of the queue in descending order of priority, because as new calls come in, process 67 assigns priority to the call and places the call in the queue (assigns order of placement) by descending order of priority assigned.

As an additional feature, call interruption may be prevented on low priority calls past a certain point in the script, to avoid "churning" of resources, where the redirection could take longer than finishing the call.

In this example, agent 1 is reported busy with a priority 10 call and cannot be interrupted by a lower priority call. Agent 3 is reported busy with a priority 7 call and cannot be interrupted with a same priority call. Agent 4 is reported busy with a priority 9 call and cannot be interrupted with a lower priority call. However, it is determined that agent 2 is busy with a priority 6 call and can be interrupted with a higher priority call. In this instance, call 1 is routed to agent 2 with an alert to the agent via screen pop-up, or other method known in the art, to dispose of call 6. In this case agent 2 sends the priority level 6 call back to queue 69 where it is promoted based on priority to call number 2 for re-routing. Agent 2 is now free to accept call 1. Agent 2 may have more options with regards to disposing of the priority level 6 call in other embodiments without departing from the spirit and scope of the present invention such as transferring to another agent, transferring to an automated voice response unit, etc. Also, the bumping could be completely automatic without further agent participation.

It will be apparent to the skilled artisan that features of the present invention may be practiced with other mediums of communication than voice calls without departing from the spirit and scope of the, such as E-mails, Faxes, Video calls, and other types of muti-media communication mediums that can be utilized within a multi-media call center. For example, general address E-mails arriving from Internet 15 (FIG. 1) may be queued with priority assigned so that high priority L-mails are sent to designated agents and so on. With respect to Internet Protocol Network Telephony (IPNT) calls, for example, the calls could have priority assigned and be queued in much the same way as voice calls, except the distribution would be by routing to agent's PCs by way of LAN 57. Such a queue could be accomplished in processor 23 of FIG. 1, or on another server on the LAN, and be automated such that calls are routed according to programmed rules based on priority assignment, and also with reference to recorded agent skills.

It will also be apparent to one with skill in the art that the present invention can be applied to virtually any type of communication that can be received by an agent via telephone channel or computer connection, such as by LAN 57, without departing from the spirit and scope of the present invention. These include, but are not limited to POTS calls ISDN calls, E-mails, transferred word documents, IP calls, Video calls, Faxes, and other types of communication media such as may be known in the art. It will further be apparent to one with skill in the art that different priority levels may be applied to different modes of communicating without departing from the spirit and scope of the present invention. For example, POTS calls may be programmed with a certain priority system while automated systems such as IVR systems may be programmed under a different priority system within the same call center, and under different rules than applied to the POTS calls. A wide variety of differing embodiments are possible within a given call center, or in communication networks. The spirit and scope of the present invention is limited only by the claims that follow.

What is claimed is:

1. A telephony router for routing prioritized calls to individual telephones at agent stations in a call center, comprising:

a priority module adapted to determine and assign a routing priority to arriving telephony calls to be routed: and a routing queue;

wherein the router executes on a processor coupled to a telephony switching apparatus in the call center, calls are routed in order from the head of the queue, prioritized calls are placed in the routing queue in descending order of priority from the head of the queue, calls are routed partly based on the availability of agents, and an agent is considered available if the agent is engaged in a previously routed call of lower priority than a new call to be routed.

2. The telephony router of claim 1 wherein a call bumped by a higher priority call is placed back in the routing queue in order of priority.

3. The telephony router of claim 1 wherein routing destinations comprise Interactive Voice Response (IVR) units.

4. A telephony call center for routing incoming calls to telephones at individual agent stations comprising:

a call switching apparatus having at least one incoming trunk and two or more telephony channels to telephones at agent stations;

a Computer Telephony Integration (CTI) processor connected to the call switching apparatus and running a CTI application; and a routing system;

wherein the routing system is adapted to assign priority to incoming calls, and to cause calls to placed in a queue of calls to be routed according to order of priority, calls are routed partly based on the availability of agents, and an agent is considered available if the agent is engaged in a previously routed call of lower priority than a new call to be routed.

5. The call center of claim 4 wherein the routing system has access to a database containing information about callers, and priority is determined in part by accessing caller information in the database.

6. The call center of claim 5 wherein the call center receives information related to a call, forwards the information with or parallel to the call, and routing priority is determined in part by the information forwarded.

7. The call center of claim 5 wherein a call bumped at an agent station by a higher priority call is placed back in the routing queue in order of priority.

8. A method for routing telephone calls, comprising steps of:

(a) assigning priority to incoming calls, creating thereby prioritized calls;

(b) placing the prioritized calls in a routing queue wherein calls are routed sequentially from the head of the queue in order of priority;

(c) selecting an agent station destination for each call reaching the head of the queue, wherein the agent is selected for receiving a routed call even though the agent is already engaged in a call if the call to be routed is assigned a higher priority than a call in which the agent is engaged; and (d) routing the prioritized calls to the selected destinations in order of priority.

9. The method of claim 8 including a step wherein a call bumped at an agent station by a higher priority call is placed back in the routing queue in order of priority.

* * * * *